May 2, 1939.  F. W. CALDWELL  2,156,750
RELEASABLE PROPELLER DRIVE
Filed Aug. 8, 1936  2 Sheets-Sheet 1

INVENTOR.
Frank W. Caldwell
BY Harris G. Luther
ATTORNEY

May 2, 1939.   F. W. CALDWELL   2,156,750
RELEASABLE PROPELLER DRIVE
Filed Aug. 8, 1936   2 Sheets-Sheet 2

INVENTOR.
Frank W. Caldwell
BY Harris G. Luther
ATTORNEY

Patented May 2, 1939

2,156,750

UNITED STATES PATENT OFFICE 2,156,750

RELEASABLE PROPELLER DRIVE

Frank W. Caldwell, Hartford, Conn., assignor to United Aircraft Corporation, East Hartford, Conn., a corporation of Delaware Application August 8, 1936, Serial No. 94,990

9 Claims. (Cl. 170—135.6)

This invention relates to improvements in vehicle power plants, and has particular reference to improvements in the driving connection between an engine and a propeller driven by the engine.

An object of the invention is to provide a driving connection between a propeller driving engine and a propeller driven by the engine so arranged that a driving connection will be maintained between the engine and propeller and the propeller may be permitted to overrun the engine at a greater speed in the same direction.

A further object resides in the provision of manually controllable means for establishing a one-way or a two-way driving connection between the engine and the propeller driven thereby.

A still further object resides in the provision of means operatively associated with the manually controllable means for automatically allowing the propeller to go into its high pitch condition when it is free to overrun the engine.

Other objects and advantages will be more particularly pointed out hereinafter or will become apparent as the description proceeds.

In the accompanying drawings in which like reference numerals are used to designate similar parts throughout, there is illustrated a suitable mechanical embodiment of what is now considered to be the preferred form of the idea of the invention. The drawings, however, are for the purpose of illustration only and are not to be taken as limiting the invention, the scope of which is to be measured entirely by the scope of the appended claims.

In the drawings,

Fig. 1A is a elevational view on a reduced scale of a fragmentary portion of a suitable controllable pitch aeronautical propeller.

Figure 1:
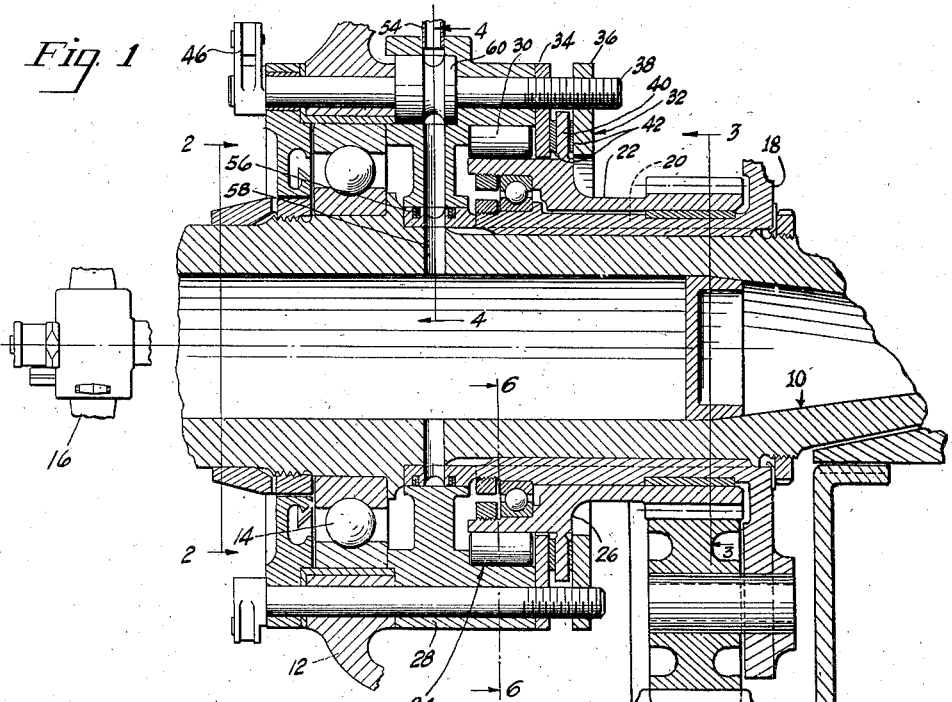
Figure 1 is a longitudinal sectional view of a propeller driving connection constructed according to the idea of this invention.
Figure 2:
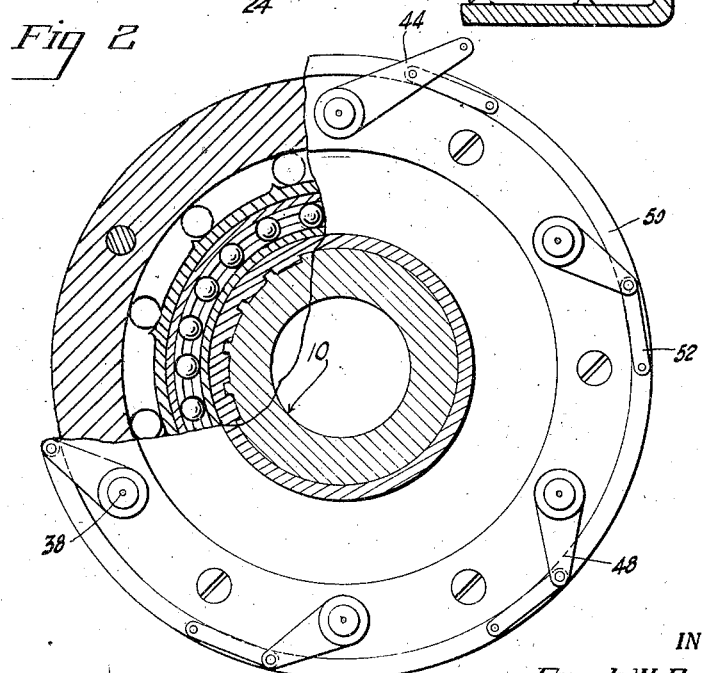
Fig. 2 is a transverse sectional view on the line 2—2 of Fig. 1.
Figure 3:
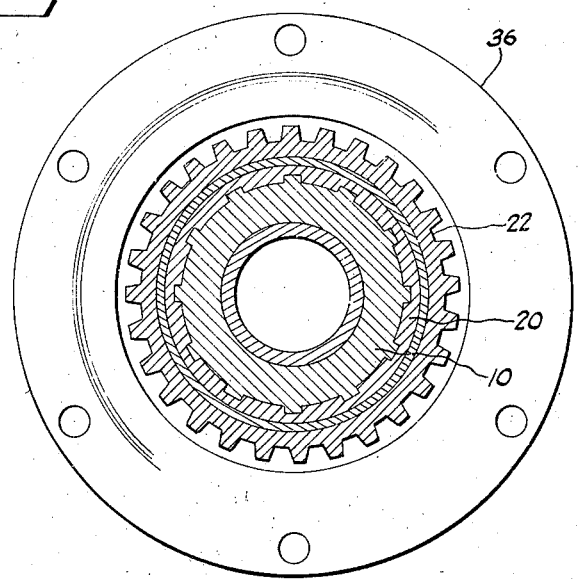
Fig. 3 is a transverse sectional view on the line 3—3 of Fig. 1.

Referring to the drawings in detail, the numeral 10 generally indicates the propeller carrying and driving shaft of a propeller driving power plant, such as a radial internal combustion engine. It is to be understood, however, that the invention is not limited to the particular type of power plant used. The numeral 12 indicates the fixed front or nose portion of the engine within which the shaft 10 is mounted for rotation by the antifriction bearing 14.

The propeller 16 may be of the hydraulically actuated controllable pitch type utilizing a hydraulically actuated mechanism for turning the propeller blades to low pitch against the force of centrifugal action urging the blades to high pitch. Such propellers are well known to the art, one example being particularly illustrated and described in Patent No. 2,032,255 issued February 25, 1936, to Frank W. Caldwell. The propeller shaft 10 is driven from the engine through a planetary reduction gear in which the planetary gears 17 are mounted upon a cage 18 drivingly connected by suitable means, such as the interengaging splines 20, to the propeller shaft 10. The planetary gears are driven by a suitable drive gear 21 operatively connected with the engine crankshaft 11 and react against a sun gear 22. In this type of reduction gear, as long as the sun gear is maintained against rotation, the planetary gears will be forced to revolve around the sun gear, carrying the cage 18 and thereby rotating the propeller shaft 10, but if the sun gear is allowed to rotate in a direction opposite to the direction of the drive gear which drives the planetary gears, the motion of the drive gear will be taken up by rotation of the sun gear and the cage 18 will either remain stationary or, if force be applied thereto in the right direction, may rotate backwardly in the same direction as that in which the sun gear rotates. Conversely, if the propeller is tending to drive the engine, the drive will be through the cage 18 to the planetary gears, and the planetary gears will drive the drive gear connected with the engine crankshaft, and the reaction to the driving force of the planetary gears will be taken by the sun gear 22, so that if the sun gear be allowed to rotate freely in the same direction as that in which the propeller is rotating, the rotation of the propeller may be taken up by the sun gear without rotating the main drive gear on the engine crankshaft. If the sun gear 22 be restrained from rotation in a direction opposite to the rotation of the propeller but allowed to rotate in the same direction as that in which the propeller rotates, the engine will always drive the propeller, but the propeller may rotate without driving the engine whenever the rotational speed of the propeller is greater than that of the engine. With this principle in view, a one-way clutch, generally indicated at 24, is interposed between a flanged portion 26 of the sun gear and a fixed member 28 rigidly connected to the fixed nose piece 12 of the engine. This one-way clutch may be of any suitable construction, the form illustrated comprising a plurality of rollers 30 mounted in cam-shaped depressions provided in the flanged portion 26 of the sun gear, the cam portions being deeper at one end than at the other so that the sun gear may rotate with respect to the fixed member 28 in one direction but rotation in the opposite direction is prevented by the wedging of the rollers between the cam depressions in the flange portion 26 and the surrounding annular surface of the fixed member 28. As one-way or free wheeling clutches of the type indicated are well known to the art, it is believed that a further description of such a clutch is unnecessary for the purpose of this disclosure. The clutch in this particular case is so arranged that the sun gear 22 may rotate with respect to the fixed member 28 in the same direction of rotation as that in which the engine drives the propeller 16 and is restrained against motion in the opposite direction, so that the reaction of the planetary gears is positively resisted by the sun gear and the planetary gears consequently rotate the cage 18 whenever power is being transmitted from the engine to the propeller.

From the construction so far described, it will be observed that the engine will always drive the propeller when power is being transmitted from the engine to the propeller but that power will not be transmitted from the propeller to the engine, and when such a condition tends to occur, the propeller will simply overrun the engine at a greater speed in the same direction of rotation.

A driving connection which permits the propeller to freely overrun the engine whenever there is a tendency for the engine speed to fall below the rotational speed of the propeller is desirable only under certain conditions, such as when one of the engines of a multi-motored airplane fails and it is desired to decrease the drag of the rotating or windmilling propeller. Under these conditions, it has been found that the drag of a free wheeling propeller in high pitch condition is no greater than, and in many instances may be less than, the drag of a locked feathered propeller. However, the drag of a free wheel propeller in low pitch may be greater than the drag of the propeller when connected to the engine through a two-way driving connection, and this factor may be made use of to provide increased drag to slow down the diving speed of airplanes used for diving maneuvers. Certain other conditions may occur in which it is desirable to change the drag or negative thrust of the propeller by allowing it to overrun the engine, but the two instances mentioned above are believed to be sufficient for the purpose of this disclosure, the first instance in particular, namely, that of reducing the drag of a propeller connected with a defective engine of a multi-motored airplane, being among the more specific objects of the present invention. As it is desirable to have the propeller overrun the engine only under the particular circumstances mentioned above and similar circumstances which do not frequently occur in the general operation of airplanes, it is desirable that the propeller may be normally restrained from free rotation in either direction with respect to the engine. For this purpose, a manually actuatable friction clutch, generally indicated at 32, has been provided for normally restraining the sun gear 22 against rotation in either direction.

This clutch includes a pair of pressure plates 34 and 36 mounted upon a plurality of rotatable pins 38 circumferentially spaced around the nose piece of the engine about the axis of the shaft 10 and the sun gear 22. The pressure plate 36 has a screw threaded connection with all of the pins 38 so that upon manual rotation of the pins the pressure plate 36 can be moved toward or away from the pressure plate 34 to frictionally hold or release a clutch disk 40 which is non-rotatably attached to or formed integrally with the sun gear 22. Preferably, annular disks of friction material 42 are interposed between the pressure plates 34 and 36 and the clutch disk 40. One of the pins 38 is provided at its end projecting out of the nose piece 12 with an elongated lever member 44 to the free end of which is connected a linkage arrangement, indicated at 46, which leads to a manual control, not illustrated, placed within convenient reach of the operator of the vehicle. All other rotatable pins 38 are provided with shorter lever members, as indicated at 48, and the free ends of all of these lever members are connected to an annular link 50 by suitable means, such as the links 52, so that upon movement of the lever member 44 by the manually actuatable linkage 46 all of the pins 38 will be rotated simultaneously to move the pressure plate 36.

Normally the pins 38 are maintained to a position to hold the pressure plate 36 in engagement with the clutch disk 40 under sufficient pressure to restrain the sun gear 22 against rotation so that a two-way drive is provided between the propeller 16 and the propeller driving engine. When it becomes desirable to provide a one-way drive between the engine and the propeller, the linkage 46 is actuated to rotate the pins 38 in a direction and to an extent sufficient to release the frictional engagement between the clutch disk 40 and the pressure plates 34 and 36. Under these conditions, the one-way clutch 24 will still restrain the sun gear 22 from rotation in a direction which will permit the engine to rotate without driving the propeller, but will permit the sun gear to rotate in a direction permitting the propeller to rotate without rotating the engine.

Figure 4:
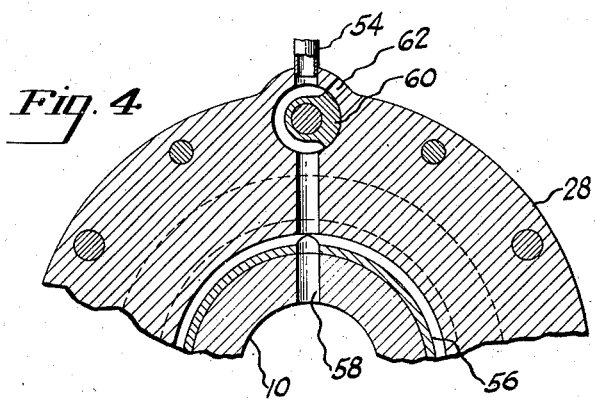
Fig. 4 is a transverse sectional view on the line 4—4 of Fig. 1.
Figure 5:
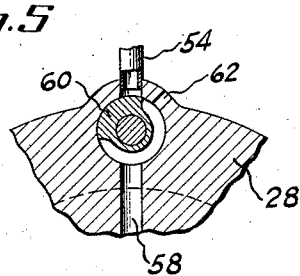
Fig. 5 is a sectional view of a fragmentary portion of a member 28 similar to Fig. 4 showing the valve 60 in a different operative position.
Figure 6:
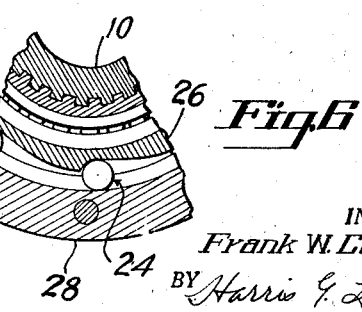
Fig. 6 is a sectional view of a fragmentary portion of the device taken on the line 6—6 of Figure 1.

Hydraulic fluid under pressure is led to the hydraulic actuated mechanism of the propeller 16 through a channel 54 in the fixed member 28, which channel leads through a suitable oil collector ring 56 to apertures 58 leading to the interior of the shaft 10 through which the oil is supplied to the propeller actuating mechanism. One of the pins 38, preferably the one to which the manually actuatable linkage 46 is connected, is provided with a valve portion 60 disposed in the fluid conduit line 54. The fixed member 28 is provided adjacent the line 54 with a drain aperture 62, and the valve 60 is effective, as particularly illustrated in Fig. 4, to provide a continuous channel from the line 54 in the fixed member 28 whenever the corresponding pin 38 is in a position to maintain the pressure plates 34 and 36 in frictional engagement with the clutch plate 40. Whenever the pin is rotated to a position to release the clutch plate 40 from its frictional engagement with the pressure plates, the valve 60 is simultaneously rotated to a position in which it connects the interior of the shaft through the apertures 58 and a portion of the channel 54 with the drain aperture 62 so that hydraulic fluid is permitted to drain out of its hydraulic propeller controlling mechanism whenever the clutch 32 is released so that the propeller may automatically go into its high pitch position whenever it is allowed to free wheel with respect to the engine.

While I have shown a plurality of rotatable pins having screw threaded connections with the pressure plate 36 for operating the clutch 32, it is to be understood that various other suitable and well known cluch operating mechanisms may be employed and also that the valve 60 may take various forms, such as may be suggested to one skilled in the art by the teaching of this disclosure.

While there has been illustrated and described a particular mechanical arrangement exemplifying the idea of the invention, it is to be understood that the invention is not to be limited to the paricular arrangement so illustrated and described, but that such changes in the size, shape, and arrangement of parts may be resorted to as come within the scope of the appended claims.

Having now described the invention so that others skilled in the art may clearly understand the same, what it is desired to secure by Letters Patent is as follows:

What is claimed is:

1. In combination with a propeller driving engine, a hydraulically actuated controllable pitch propeller driven thereby and a planetary reduction gearing having a normally fixed sun gear between said engine and said propeller, one-way clutch means operatively associated with said sun gear to restrain said sun gear against rotation in one direction whereby said engine may drive said propeller and said propeller may overrun said engine in the same direction of rotation, manually actuatable clutch means operatively associated with said sun gear and the relatively fixed structure of said engine to normally restrain said sun gear against rotation in either direction to provide a two-way driving connection between said engine and said propeller, and means associated with said friction clutch for adjusting said controllable pitch propeller to its high pitch condition whenever said friction clutch is released to provide a one-way driving connection between said engine and said propeller.

2. In combinaiton with a propeller driving engine, a hydraulically actuated controllable pitch propeller driven thereby and a planetary reduction gearing having a normally fixed sun gear between said engine and said propeller, one-way clutch means operatively ¿ssociated with said sun gear to restrain said sun gear against rotation in one direction whereby said engine may drive said propeller and said propeller may overrun said engine in the same direction of rotation, manually actuatable friction clutch means operatively associated with said sun gear and the relatively fixed structure of said engine to normally restrain said sun gear against rotation in either direction to provide a two-way driving connection between said engine and said propeller, and a valve associated with said friction clutch actuating means for draining hydraulic fluid from said propeller to place the propeller in high pitch condition whenever said friction clutch is released to provide a one-way driving connection between said engine and said propeller.

3. In combination with an engine and a hydraulically actuated controllable pitch propeller driven thereby, one-way driving means between said engine and said propeller whereby said engine may drive said propeller and said propeller may overrun said engine in the same direction of rotation, means comprising a manually actuatable friction clutch for establishing a two-way driving connection between said engine and said propeller, and means associated with said friction clutch for placing said controllable pitch propeller in its positive high pitch condition whenever said friction clutch is released to provide a one-way driving connection between said engine and said propeller.

4. In combination with an engine and a controllable pitch propeller driven thereby, means for establishing a one-way driving connection between said engine and said propeller, manually actuatable means for establishing a two-way driving connection between said engine and said propeller, and means associated with said manually actuatable means for placing said propeller in its positive high pitch condition when said manually actuatable means is actuated to establish a one-way driving connection between said engine and said propeller.

5. In combination with an engine and a controllable pitch propeller having positively limited high and low pitch positions, means for exerting a force effective to change the pitch of a propeller to one of said limited positions, said propeller being urged to the other limited position by a force effective to move the propeller blades when said means is ineffective, means for establishing a one-way driving connection between said engine and said propeller, manually actuatable means for establishing a two-way driving connection between said engine and said propeller, and means associated with said manually actuatable means for rendering one of said forces effective to adjust the pitch of the propeller to one of its positively limited pitch positions whenever the manually actuatable means is actuated to establish a one-way driving connection between said engine and said propeller.

6. In combination with a propeller driving engine and a controllable pitch propeller driven thereby, hydraulically actuated means for changing the pitch of said propeller, said propeller being urged to changed pitch by a force effective to move the propeller blades when the hydraulically actuated means is ineffective, means providing a one way or a two way driving connection between said engine and said propeller, manually operable means for selectively changing said connection from one to the other of said one way and two way driving conditions, and means actuated by said manually operable means, when operated to establish a one way drive between said engine and said propeller, to render said hydraulically actuated means ineffective to change the pitch of said propeller for the duration of said one way drive operation, thereby allowing the said force to change the pitch.

7. In combination with a propeller driving engine and a controllable pitch propeller driven thereby, means continuously urging said propeller toward a high pitch setting, control means operative to overcome the effect of said continuously urging means and to change said propeller pitch toward a low pitch setting, means including a one way clutch and a friction clutch operative to provide a one way or a two way drive between said engine and said propeller, means for manually controlling said friction clutch, and means operatively connected with said manual control means for rendering said pitch control means inoperative to change the pitch of the propeller and thereby allow said continuously urging means to increase the pitch whenever said manual control is actuated to establish a one way drive between said engine and said propeller and to restore said pitch control means to operativeness when said manual control is actuated to establish a two way drive.

8. In a controllable pitch propeller adapted to be driven by a motor, hydraulically actuated means for changing the pitch of the blades of said propeller in one direction, said blades being urged to change their pitch in the opposite direction by a force effective to move said blades when the hydraulically actuated means is ineffective, one way driving means comprising a cam and roller clutch between said motor and said propeller whereby said motor may drive said propeller and said propeller may overrun said motor in the same direction of rotation, means comprising a manually actuatable friction clutch for normally maintaining a two way driving connection between said motor and said propeller, and a valve associated with said friction clutch for rendering said hydraulically actuated means ineffective when said clutch is released.

9. In combination with a propeller driving engine and a controllable pitch propeller driven thereby, means actuated by hydraulic pressure for changing the pitch of said propeller in one direction, said propeller being urged to changed pitch in the opposite direction by force effective to move the propeller blades when said hydraulic pressure is rendered ineffective to change the pitch of said propeller in said one direction, means providing a one-way or a two-way driving connection between said engine and said propeller, manually operable means for selectively changing said connection from one to the other of said one-way and two-way driving conditions, and means actuated by said manually operable means when operated to establish a one-way drive between said engine and said propeller, to render said hydraulic pressure ineffective to change the pitch of said propeller for the duration of said one-way drive operation and thereby allowing the said force to change the pitch.

FRANK W. CALDWELL.